United States Patent Office 2,988,960
Patented June 20, 1961

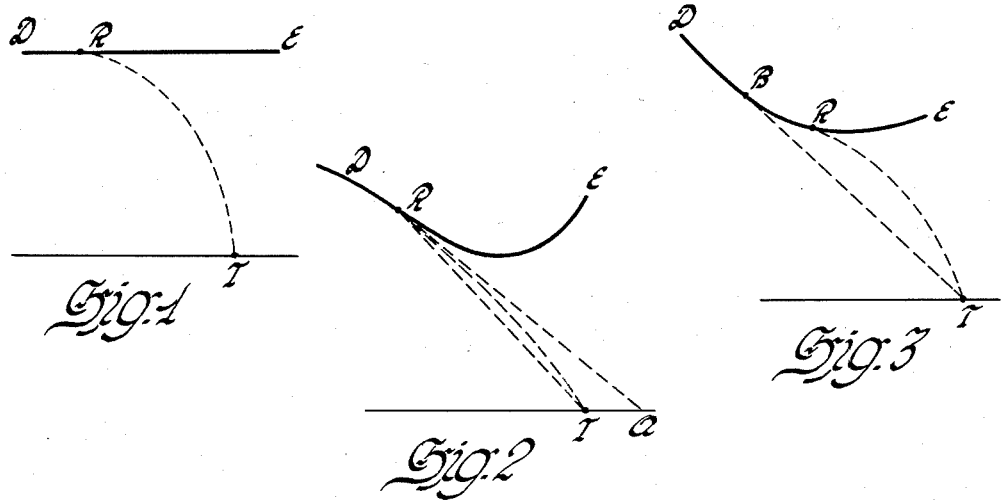
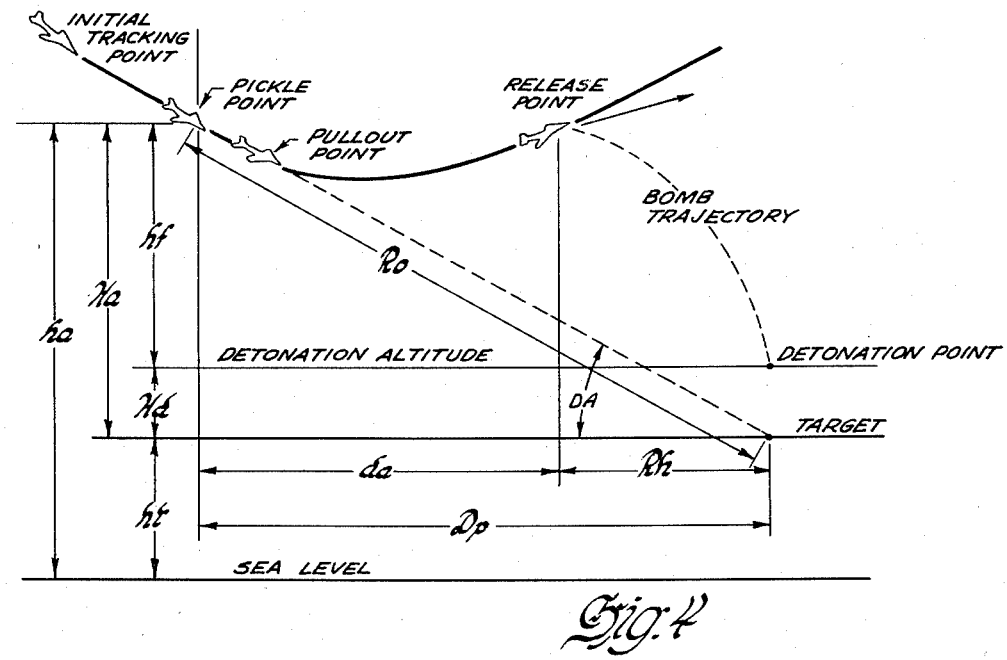
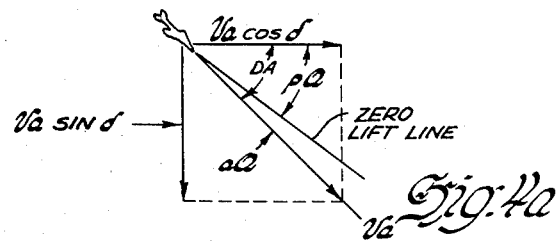

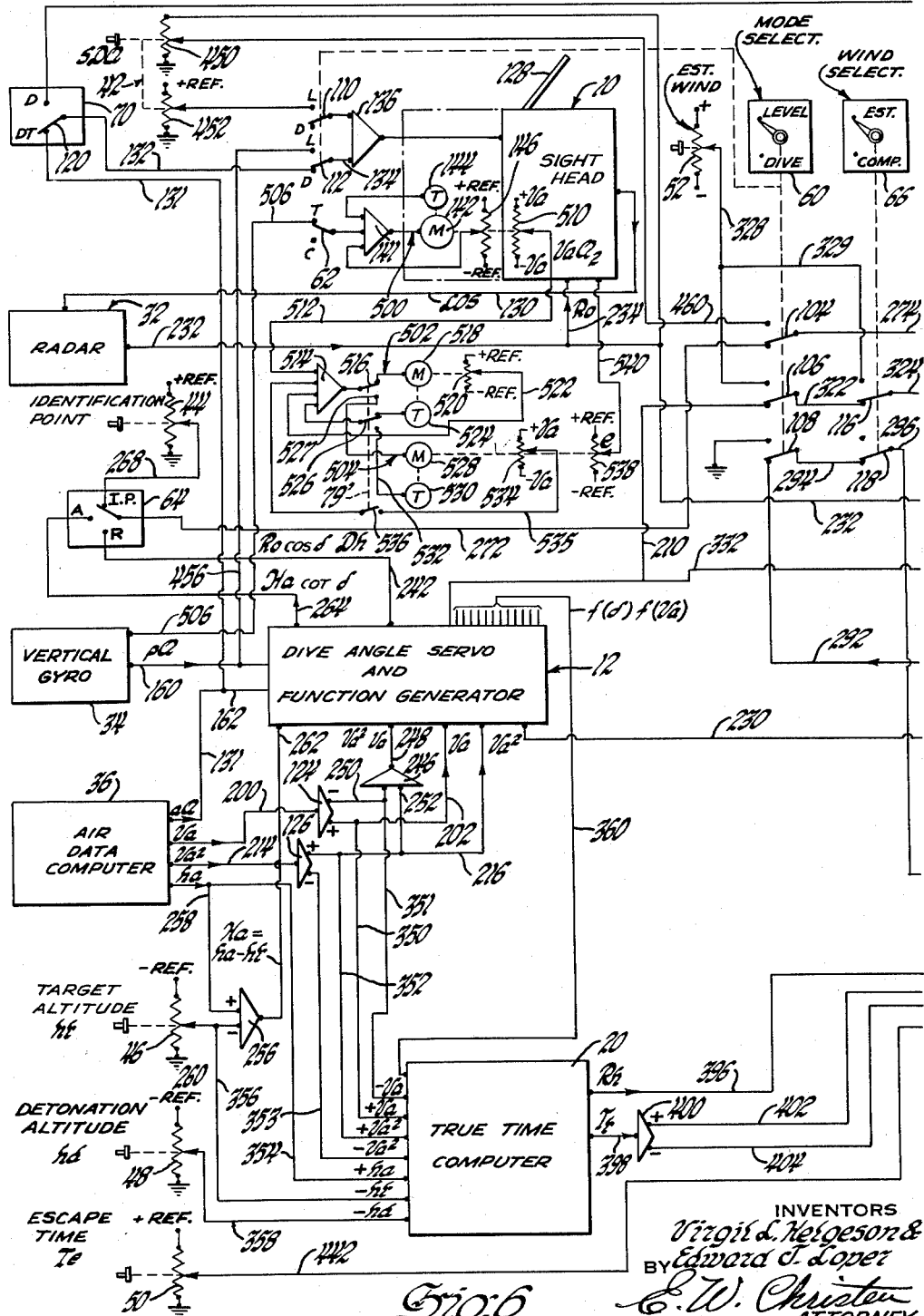

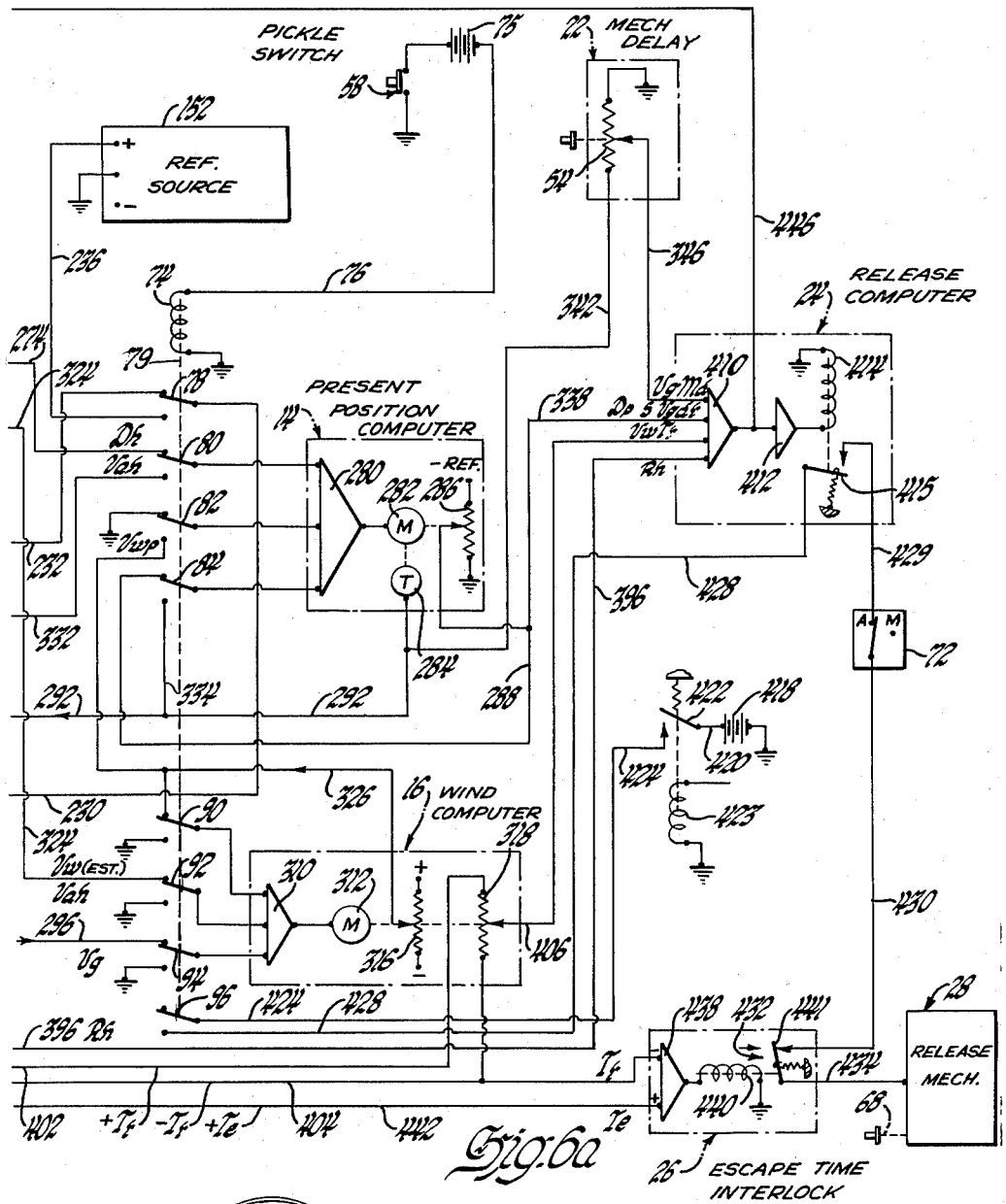
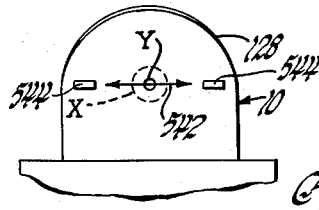

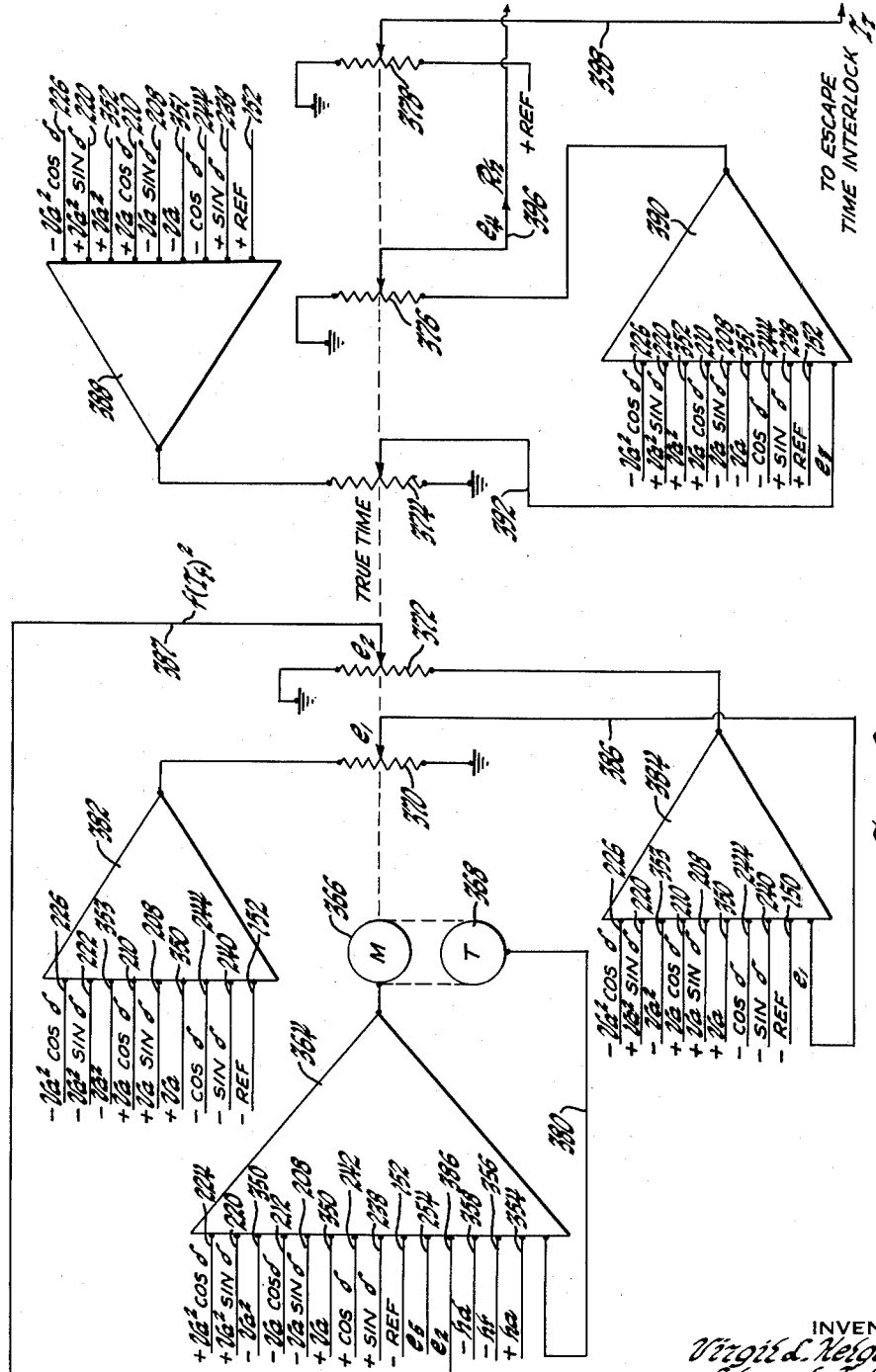

2,988,960
BOMBING NAVIGATIONAL COMPUTER
Virgil L. Helgeson and Edward J. Loper, Milwaukee, Wis., assignors to General Motors Corporation, Detroit, Mich., a corporation of Delaware
Filed July 16, 1956, Ser. No. 598,034
5 Claims. (Cl. 89—1.5)

This invention relates to aircraft bombing computer systems for providing a solution to a bombing problem.

Such systems require for the successful solution of a bombing problem that the aircraft be flown along a path which at some point is tangent to a bomb trajectory intersecting the target. To this end, computers have been designed to effect bomb release when the aircraft is flown at a predetermined velocity through a predetermined point of tangency to a predicted bomb trajectory intersecting the target. In these systems, all of the initial conditions are determined prior to the flight of the craft, and the pilot simply flies the craft at a predetermined speed and altitude along a given flight course and releases the bomb at a particular angle at a predetermined point. While relatively simple systems can be instrumented on this basis, such systems are limited in their operation to a few precomputed attack courses and their inflexibility is of considerable tactical and operational disadvantage.

The present invention has for its general object to provide a bombing computer which continuously solves the horizontal and vertical distance equations in the vertical plane containing the craft and target and does not impose any restrictions on the approach, direction, altitude, speed and pull-out maneuver of the craft.

A related object is to provide a multiple-function bombing computer which is adapted to provide a solution to a bombing problem for any one of several operating modes including the dive, dive toss, level and level toss bombing modes.

Towards the accomplishment of these general ends the present invention provides a bombing computer which derives a plurality of functionally related distance signals from airborne information including the horizontal distance of the craft to the target, the velocity of the craft relative to the target, the true airspeed or velocity of the craft relative to the air mass, the velocity of the air mass relative to the target and the height of the aircraft above the target and instruments these signals into a bomb release equation which is continuously solved to determine the appropriate bomb release point. Initial conditions are determined in flight by tracking the target and establishing either an optical or a pseudo-sight line intersecting the target with an optical sight head or combination of sight head and mapping radar and by ranging on the target to determine the horizontal distance of the craft to the target at an initial point along the flight path. Upon acquiring and tracking the target with the sight, the horizontal distance of the craft to the target is memorized at this point, hereinafter called the pickle or aim point. Thereafter, the distance the craft has flown in a horizontal direction toward the target from the pickle point and the horizontal trajectory of the bomb are continuously measured and subtracted from the memorized horizontal craft to target distance to effect bomb release when the difference of these distances passes through zero. After establishment of the initial conditions including the memorization of the pickle distance, the craft may be flown in any manner and may execute any maneuver in the vertical plane containing the craft and target and still be able to release the bomb to strike the target.

Among the ancillary objects of the present invention is to provide a bombing computer of the above character in which the horizontal range distance of the craft to the target may be determined either by radar ranging or altimeter ranging on the target in the event that radar operation is disabled or tactically not feasible.

Another object is to provide a bombing computer of the above character featuring means for facilitating target tracking with the sight head in order to improve the accuracy of the bombing system.

Another object is to provide a bombing computer of the above character featuring means for determining the present position of the craft relative to the target regardless of any change in the attitude or flight course of the craft in the craft to target plane after the determination of the initial conditions.

Another object is to provide a bombing computer of the above character featuring a range wind computer for determining and accounting for the effect of any relative motion between the craft and target, including range wind, upon the bombing problem.

Still another object is to provide a bombing computer of the above character featuring an escape time interlock which prevents bomb release in the event that the computed time of fall of the bomb along the predicted trajectory is less than a minimum safe set-in value that affords the pilot ample time to execute an escape maneuver beyond the detonation area or burst of the bomb.

Another object is to provide a bombing computer of the above character in which means are provided for determining the distance the craft will fly in a horizontal direction during any inherent time delay of the release mechanism and correcting the bomb release equation for this amount.

The above and other objects, features and advantages of the present invention will appear more fully from the following detailed description and drawings wherein:

FIGS. 1, 2 and 3 illustrate the general forms of the flight paths for the level, pure dive and dive toss bombing modes, respectively;

FIG. 4 is a graphical representation of the geometry involved in the solution of the dive toss bombing problem;

FIG. 4a is a graphical representation of the geometry involved in deriving the dive angle;

FIGS. 6 and 6a are an electrical schematic representation of the general organization of a form of bombing computer in accordance with the present invention;

FIG. 6b illustrates a form of reticle presentation of the sight head used in FIGS. 6 and 6a;

FIG. 7 illustrates the mechanization of the dive angle servo and function generator employed in FIGS. 6 and 6a; and FIG. 8 illustrates the mechanization of the true time servo computer employed in FIGS. 6 and 6a.

Figure 5:
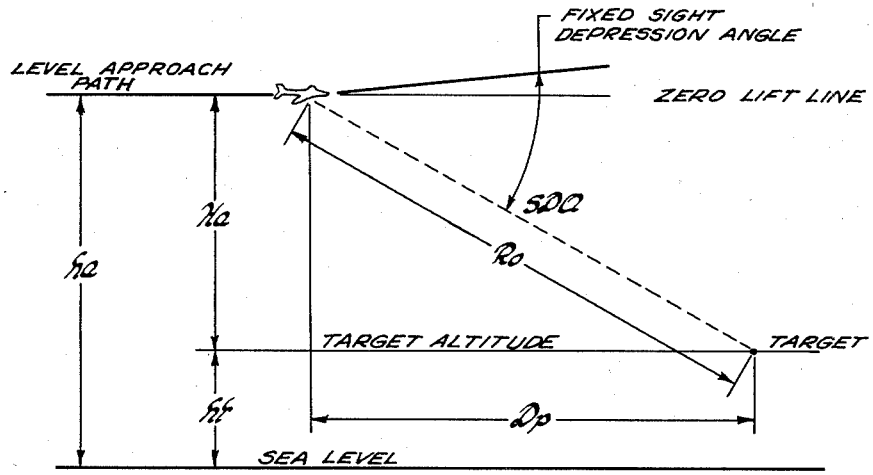
FIGS. 5 and 5a are graphical representations of the geometry involved in the solution of the level and level toss approach bombing modes.

In order to provide a bombing system that is of maximum versatility and is operable under different operating and tactical conditions for delivery of various weapons, the bombing computer of the present invention is instrumented to provide a solution to a bombing problem in any one of several approach modes including the level, level toss, dive and dive toss bombing modes.

In level bombing, illustrated in FIG. 1 the aircraft flies a straight horizontal path D—E parallel to the horizontal plane containing the target T and drops the bomb at a point R that is tangent to a predicted trajectory intersecting the target. In dive bombing, illustrated in FIG. 2, the aircraft is flown along a lead predicting course directed beyond the target T. The sight line R—T to the target and the line of flight D—A at the point of release R are inclined to each other at an angle called the elevation lead angle. Release may be effected at any point along the flight path so long as the pilot is tracking the target.

Toss or glide bombing may be performed in either the level or dive modes and may offer certain operational and/or tactical advantages over the pure dive and level approach modes, as where it is desired to execute a pull-up or escape maneuver prior to bomb release. In the dive toss mode illustrated in FIG. 3, the aircraft dives directly at the target along an impact or collison course D—T and pulls out of the dive at the point B, releasing the bomb at a suitable point R along the pull-out curve B—R—E.

The geometry of the dive toss solution is more fully illustrated in FIG. 4 from which the general release equation governing the solution to the bombing problem is developed below. Initial aircraft position information is obtained by diving on the target along a collision path established with the aid of a sighting device, such as a sight head, with which the pilot may optically track the target. At some point along the dive path, herein named the aim or pickle point, the ground distance of the craft to the target T is memorized, the value of this distance at pickle being represented by the symbol $D_p$. Thereafter, the horizontal distance $d_a$, representing the horizontal distance that the craft has flown from the pickle point, together with the horizontal range distance $R_h$, representing the horizontal component of the bomb trajectory or the horizontal distance that the bomb will travel from release, are continuously computed and subtracted from the pickle distance $D_p$ to give the general release equation below:

$$D_p - d_a - R_h = 0 \quad (1)$$

The distance $D_p$ may be obtained either by radar ranging on the target to obtain the slant range distance $R_o$ or by altimeter ranging to obtain the vertical distance $H_a$, representing the height of the craft above the horizontal target plane, and by trigonometrically resolving either of these quantities by the angle DA included between the sight line and the horizontal. This angle, hereinafter called the dive angle DA, represents the attitude of the craft in the air mass. As illustrated in FIGURE 4a the dive angle, DA, is composed of the aircraft pitch angle $pA$, representing the angle between the horizontal and the fuselage reference line or zero lift line of the craft, and the craft angle of attack, $aA$, which is measured between the zero lift line and the true airspeed vector $V_a$ directed along the sight line. From this data, the horizontal distance $D_p$ of the craft from the pickle point to target can be computed according to the following relationship:

$$D_p = R_o(\cos DA) \quad (2)$$

In the event that radar information is not available, the height $H_a$ of the pickle point above the target plane can be employed in place of $R_o$, in which case the following expression $D_p$ may be employed:

$$D_p = H_a(\cot DA) \quad (3)$$

As is evident from FIG. 4, $H_a$ is equal to the difference between the altitude quantity $h_a$, representing the absolute altitude of the craft above sea level or a reference plane, and the quantity $h_t$, representing the known target altitude above sea level or reference plane.

The distance $d_a$, representing the distance of the craft from the pickle point measured in a horizontal direction, is computed directly in a present position computer as the time integral of the ground velocity $V_g$ of the aircraft relative to the target from the instant of pickle to release, as expressed below:

$$d_a = \int_P^R V_g dt \quad (4)$$

The quantity $V_g$ may be expressed as the difference between the horizontal component of true air speed, $V_a$, and relative target motion including range wind, $V_w$, according to the following equation:

$$V_g = V_a \cos DA - V_w \quad (5)$$

Provision is made in the bombing computer for the selection of either a hand-set, estimated statistical wind or a computed value of wind at pickle. Computed wind is obtained from a range wind computer which subtracts the time rate of change of the horizontal distance to the target or the horizontal component of slant range from the horizontal component of true air speed in accordance with the expression below:

$$V_w = V_a \cos DA - \frac{d}{dt}(R_o \cos DA) \quad (6)$$

The horizontal trajectory range distance $R_h$ is a function of the quantity $T_t$, which represents the true time of fall of the bomb along a predicted trajectory. Both of these quantities may be expressed empirically in the form of the following general quadratic equations:

$$h_f = AT_t^2 + BT_t + C \quad (7)$$

$$R_h = DT_t^2 + ET_t + F \quad (8)$$

where, $h_f$ is the height of the aircraft at the pickle point above the detonation point. The coefficients A, B, C, D, E and F of the above equations may also be of quadratic form and are composed of linear sums and products of functions of altitude, attitude, air speed from the standard bomb ballistics tables. The manner in which these equations are developed will be discussed more fully hereinafter. In the bombing computer, the quantities $R_h$ and $T_t$ are provided by a true time computer which performs an implicit solution upon the developed expressions for $T_t$ and $R_h$ for each point along the flight path during the bombing mode.

The level toss solution, whose geometry is illustrated in FIG. 5, is nearly identical with that of the dive toss solution. The method of determining $D_p$ differs, however, since the radar line of sight cannot be held on the target as it can in the dive aproach. In the high altitude level approach, $D_p$ is obtained by depressing the sight or aim line an amount called the sight depression angle SDA until the sight line intersects the target or by depressing the sight line a fixed amount and pickling at the instant the sight line intersects the target. From FIG. 5, $D_p$ in this mode may be computed from the expression below:

$$D_p = R_o \cos SDA \quad (9)$$

In the low altitude approach or in the event of radar failure or a concealed target, $D_p$ can be inserted directly into the computer by flying the craft over an identification point, whose location relative to the target is known, and pickling when the pilot passes directly over this point.

Figure 5A:
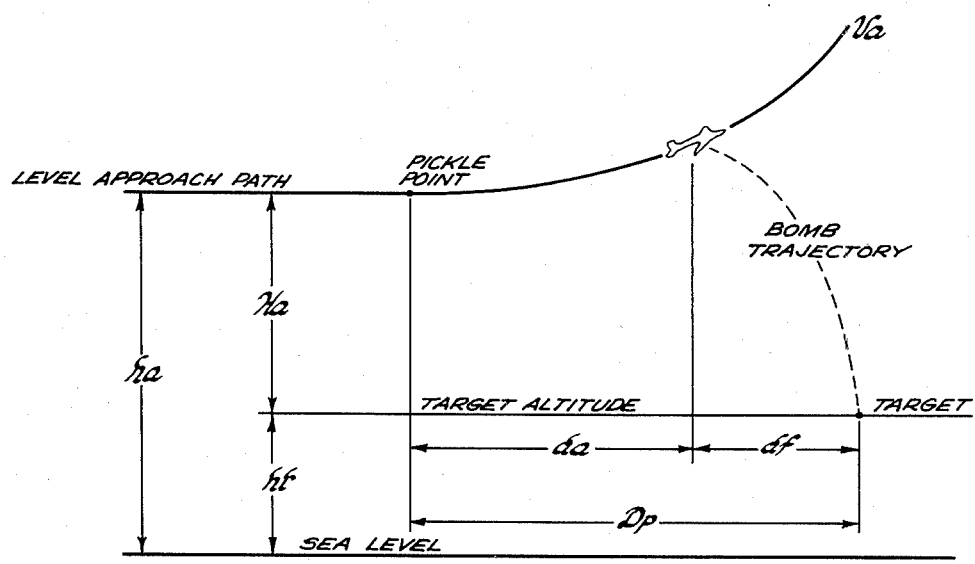

FIG. 5a illustrates the aircraft at bomb release which may occur with the aircraft at any flight attitude from level flight to beyond a vertical climb over the target. After pickle the solution to the bombing problem for the high or low altitude level aproach or level toss bombing modes is the same as that for the dive toss mode described above, the dive angle quantity in the level approach modes being zero.

A modified dive mode approximating a true dive mode can be instrumented by utilizing the dive toss mode just described and maintaining the dive at the target until the last possible moment when the pilot can still execute a given pull-up maneuver and clear the terrain and/or detonation area of the bomb. In this maneuver as in the true dive maneuver, the dive is maintained until the last possible moment in order to deliver the bomb at minimum range and maximum velocity. The pull-up maneuver can be executed upon receipt of a terrain clearance warning signal generated by a terrain clearance warning or minimum safe pull-up computer, or it can be instrumented through the automatic pilot energized from the terrain computer. Systems of this character are described and claimed in copending application S.N. 598,048, Clearance Computer System for Aircraft, filed on even date herewith in the names of Virgil L. Helgeson and Edward J. Loper, and assigned to the present assignee.

In the true dive mode, however, the pilot is presented at all times with the correct elevation lead angle enabling him to release the bomb at any time as long as he is tracking the target with the sight head. Unlike the fixed sight presentation of the sight head in the drive toss, level and level toss modes, the sight head in the true dive mode is used in a predicting capacity. The reticle of the sight head is maintained in a lead predicting position by the computer by instrumenting a signal composed of or functionally related to the quantities contained in the general release Equation 1 into the elevation channel of the sight head. Provision is made to afford the pilot the option of manual or automatic release in this mode as long as he is tracking the target.

Provision is made in the bombing computer to account for relative motion due to range wind and/or target motion during the bomb toss or true time of fall of the bomb along the bomb trajectory. This factor, $V_w T_t$, has the dimensions of a distance representing the relative displacement of the target during the bomb fall after the bomb is tossed or released into the moving air mass and is instrumented into the general release equation which may then be expressed as follows:

$$D_p - \int V_g dt - R_h - V_w T_t = 0 \tag{10}$$

The computer is also instrumented to account for the horizontal ground distance traversed by the craft during any time delay inherent in the bomb release mechanism from the time that the bomb release signal is applied to the bomb release mechanism to the time that the bomb is actually released. Since this distance may be appreciable, particularly in the case of high speed bombing craft, it will affect the accurracy of the bombing system. Therefore, the general release equation is corrected by this factor represented by the quantity $V_g M_d$ to cause actuation of the release mechanism in advance of the release point in accordance with the following expression:

$$D_p - \int V_g dt - R_h - V_w T_t - V_g M_d = 0 \tag{11}$$

where $V_g$ is the ground velocity of the craft and $M_d$, the mechanism delay time. The philosophy and organization of the mechanism delay correction computer is developed more fully in copending U.S. patent application S.N. 598,050, entitled Bomb Release Mechanism Delay Correction Computer, filed on even date herewith in the names of Virgil L. Helgeson and Edward J. Loper, assigned to the present assignee.

In order to improve target tracking and system accuracy in the various approach modes, the subject bombing computer also provides for instrumenting a drift angle or cross-wind compensation into the azimuth drive or channel of the sight head in order to compensate for cross-wind effects tending to displace the craft from the initial craft-to-target-plane position. In addition, provision is also made in the dive toss and modified dive toss modes to depress the line of sight of the sight head in elevation by the angle of attack so that the line of sight will remain parallel to the air speed vector throughout the dive in order to facilitate target tracking.

Referring now to FIGS. 6 and 6a, there is illustrated the general organization of a direct analog bombing computer in accordance with the present invention, the main components of which, except for the static and dynamic data sources, include an optical sight head 10, a dive angle computer and function generator 12, a present position computer 14, a wind computer 16, a true time computer 20, a mechanism delay correction computer 22, a bomb release computer 24, an escape time interlock 26 and a bomb release mechanism 28.

The instantaneous position, flight attitude, velocity and altitude of the craft throughout the bombing mode are continuously measured by a number of dynamic data sources including a radar ranging apparatus 32, a vertical gyro 34, and an air data computer 36. Other data signals representing the sight depression angle (SDA) identification point distance (I.D.), target altitude ($h_t$) above sea level, detonation altitude ($h_d$), escape time ($T_e$), estimated wind ($V_{we}$) and mechanism delay time ($M_d$) are obtained from a number of hand set data sources in the form of adjustable potentiometer devices, for example, including a sight depression angle potentiometer assembly 42, I.D. pot 44, target altitude pot 46, detonation altitude pot 48, escape time pot 50, estimated wind pot 52, and a mechanism delay potentiometer 54 which is included in the mechanism delay correction computer 22.

The system also includes a number of manually operable switching devices including a pickle switch 58 (FIG. 6a), a bombing mode selector switch 60, a track-cage selecter switch 62, a range selector switch 64, a wind selector switch 66 and a manual bomb release switch 68. A manually operable dive-dive toss selector switch 70 also may be provided to afford an additional selection between the pure dive and dive toss operating modes. A manual or relay operated selector switch 72 may be provided to afford a further selection between manual or automatic release in the pure dive mode.

The manually operable pickle switch 58 may be a spring return, push button switch which controls energization of a multi-pole relay 74 from a suitable source such as a battery 75 contained in conductor 76 extending between the ungrounded contact of the pickle switch and the ungrounded side of the relay coil, as shown. The relay is of the multiple pole, double-throw variety and as shown in FIG. 6a as having a plurality of ganged poles or switch arms identified by the numerals 78, 80, 82, 84, 90, 92, 94 and 96, the relay being shown in its de-energized or unpickled condition with the switch arms in their upper or front contact position. The bombing mode selector switch 60 is illustrated in FIG. 6 as a manually operable 5 P.D.T. switch having a plurality of ganged switch arms 104, 106, 108, 110 and 112 which are simultaneously operable between an upper contact position in which the bombing system is conditioned for the level approach bombing modes and a lower contact position in which the system is conditioned for the dive approach modes. The switch arms 110 and 112 of the mode selector switch 60 are shown as being associated with the elevation input channel of the sight head 10. The track-cage selector switch 62 may be a S.P.D.T. switch operable independently of the switch arms 110, 112 of the dive-level selector switch 60 and is associated with the azimuth channel of the sight head.

The bombing range selector switch 64 is a three position selector switch, the switch arm of which is operable between three contact positions to afford a selection of the horizontal distance $D_h$ of the craft to the target as obtained by altimeter ranging, radar ranging, or from a known identification point. The wind selector switch 66 is illustrated as a manually operable D.P.D.T. switch having a pair of ganged switch arms 116 and 118 which are operable between an upper contact position in which an estimated or statistical value of range wind may be introduced into the computer and a lower contact position in which a computed value of range wind may be instrumented into the computer. The dive-dive toss selector switch 70 is shown as a manually operable S.P.D.T. switch having a switch arm 120 which is operable between one position in which the sight head is employed in a lead predicting capacity for the pure dive bombing mode and another position in which the sight is employed as a fixed sight for the dive toss bombing mode.

The radar ranging apparatus may be of any suitable type such, for example, as the type APG–46 tracking radar and provides an A.C. signal proportional to the slant range distance $R_o$ of the craft to the target. The vertical gyro 34 may be a type JG7044A gyroscopic device available from Minneapolis-Honeywell Corporation and produces a linear alternating current output signal corresponding to the pitch angle quantity pA represented in FIG. 4a. The air data computer 36 may be a type AXC–129 air data computer available from the Westbury Division of Servomechanism, Inc., and is responsive to selected air pressures to develop a plurality of A.C. signals related to craft attack angle aA, true airspeed $V_a$, true air speed squared $V_a^2$, and the absolute tape line altitude $h_a$ of the craft above sea level. The quantities $V_a$ and $V_a^2$ from the air data computer may be applied to phase inverters, balanced amplifiers or equivalent devices 124, 126 in order to derive oppositely phased A.C. signals related to $V_a$, $-V_a$ and $V_a^2$, $-V_a^2$ which are used for various computations in the computer.

The sight head 10 may be a conventional servo driven optical sight head such as the model A–4 sight and may produce a fixed reticle display, such as a ten mil diameter segmented circle X, and a tracking index or center pipper Y, which may be, say a 2 mil dot, as shown in FIG. 6b, for example. Both the circle and pipper are projected and displayed in illuminated form on a transparent combining glass shown at 128 or on the windshield of the aircraft in the direct view of the pilot. The optical system producing the center pipper or tracking index may be displaced in elevation by a suitable servo drive mechanism which is associated with an elevation input channel customarily provided in sight heads of this character. The pipper normally represents the fuselage reference line or zero lift line of the craft. When the circle and the dot or pipper are aligned, the line of sight is directed along the fuselage reference line. Tracking of the target is performed by the pilot by maneuvering the aircraft so that the pipper is superimposed on the target. As is customary in sight heads of this character, the sight head also produces an electrical signal whose magnitude represents the direction of the line of sight (LOS) of the sight head. This signal is supplied over conductor 130 to the servo drive for the radar antenna so that the radar will be slaved to the line of sight and directed at the target.

For all weather tracking, the radar may be a mapping radar or IR scanner and be combined with the sight head to present a radar map on the combining glass. The pilot may, thus, establish a pseudo-sight line to the target by viewing the radar mapped target through the fixed reticle and orienting the craft attitude to center the tracking index on the fixed reticle and superimpose it on the target.

It will be appreciated that the sight head is not used in a predicting or computing capacity in the dive toss, level and level toss approach modes, but merely to provide a fixed sight line which may be displaced in elevation and azimuth, to facilitate target tracking in these modes. In the dive toss mode, for example, attack angle information is fed over a circuit traced from the air data computer over conductor 131, the dive-dive toss selector switch 70 in its lower contact or dive toss position, conductor 132 to the lower contact or dive mode position of arm 112 of the mode selector switch 60, conductor 134 connected to the input of an amplifier 136 in the elevation channel of the sight head. With reference to FIG. 4a, this enables the pilot to displace the movable pipper Y and the sight line in elevation by the amount of the attack angle aA so that the sight line will be parallel to the direction of movement or the velocity vector $V_a$ of the craft, thereby enabling the pilot to keep the pipper on the target regardless of variations in dive angle or throttle setting. If the sight line were retained in its normal setting directed along the fuselage reference line, it would be necessary for the pilot to change the attitude of the craft continuously during the dive toss approach by nosing the plane upwardly in order to fly a path aimed at the target and to keep the pipper on the target.

The alternating current reference voltage source 152 provides a pair of oppositely phased voltage outputs that are balanced with respect to ground and are synchronized with respect to the A.C. signal outputs of the various dynamic data sources, the instantaneous relative phases of the balanced outputs being represented herein by plus and minus symbols. The reference source 152 provides the energization for the various hand set data source potentiometers, feedback potentiometers and computing potentiometers and the reference windings of the various servo positioning motors used throughout the instrumentation of the present bombing computer system.

In order to ensure accuracy in the bombing system, provision is made to compensate for the effects of any relative motion of the air mass and target in a direction normal to the vertical plane containing the pickle point, relative to the target, and the target. Any such relative cross-motion, which will be referred to herein as crosswind, may be considered to have two adverse effects in the accuracy of the system. First, it tends to displace the aircraft from the vertical plane containing the pickle point and target and second, the velocity vector of the aircraft in ground coordinates being displaced from this vertical plane. In order to accomplish the necessary compensation, means are provided to enable the pilot to maintain the velocity vector of the aircraft in the prescribed vertical plane from the pickle point to the point of bomb release. This compensation may be realized with the required degree of accuracy if it is assumed that the velocity of the cross-wind remains constant throughout the bombing run. It is well known that the cross-wind compensation achieved is a function of the velocity of the aircraft with respect to the air mass and the yaw angle or azimuthal displacement of the aircraft heading with respect to an initial or reference heading. Since the velocity of the aircraft may vary substantially in the bombing run from pickle to release, especially in a pull-up maneuver, it is necessary to continuously vary the yaw angle of the aircraft to obtain instantaneously correct compensation. In general, this is accomplished by determining the magnitude of the cross-wind at the pickle point and determining the instantaneous compensation which is being made in terms of cross or lateral velocity with respect to the air mass. The difference of these quantities represents the heading or yaw error in terms of velocity. This velocity error may then be translated into angular or heading error which is presented to the human or automatic pilot, as the case may be, as an indication of the amount of roll angle which must be imparted to the aircraft in order to provide a resultant yaw angle to produce the instantaneously correct compensation.

The mechanization for this cross-wind compensation is illustrated in FIGURE 6 in the azimuth channel of the sight head 10 and includes, generally the yaw angle servo 500, the cross-wind servo 502 and the error angle servo 504. A yaw angle signal voltage $A_z$ is derived from the vertical gyro 34 on the conductor 506 which is connected to the contact T of the track-cage selector switch 62. The yaw signal voltage is proportional to the angular displacement of the aircraft from a reference position about the local gravity vector. The track-cage selector switch 62 is closed against the open circuit contact C until the bombing run is commenced. Upon acquiring the target within the pipper, as explained above, the selector switch 62 is closed against the contact T and the yaw angle signal voltage is supplied to the summing and servo amplifier 141 in the yaw angle servo 500. This servo also includes the reversible servo motor 142 having a servo shaft connected with the movable contact of the follow-up potentiometer 146. The follow-up potentiometer 146 is excited with the referene voltage and the movable contact is connected to the input of the amplifier 141 to provide a follow-up signal to close the servo loop. A rate signal or tachometer generator 144 is shaft coupled with the motor 142 and develops a rate signal which is applied as a stabilization feedback voltage to the amplifier 141. The servo 500, therefore, operates to displace its output shaft an amount corresponding to the instantaneous value of yaw angle. Therefore, by tracking or maintaining the pipper on the target for a brief interval the shaft of servo 500 is displaced an amount corresponding to the yaw angle required to compensate for the cross-wind at the existing velocity. A potentiometer 510 is excited with the velocity signal voltage $V_a$ corresponding to the speed of the aircraft relative to the air mass and includes a movable contact which is also driven by the shaft of servo 500. The signal voltage developed on the movable contact of potentiometer 510 therefore corresponds to the product of the instantaneous aircraft velocity and the yaw angle. For small angles of yaw, the angle is approximately equal to the sine of the angle and therefore the signal voltage on the movable contact of potentiometer 510 corresponds to the instantaneous value of cross-wind $V_x$. This signal voltage is applied through conductor 512 to the summing and servo amplifier 514. This amplifier 514 is utilized in the cross-wind servo 502 and is connected through switch contacts 516 to the servo motor 518. The servo 502 has an output shaft connected with the movable contact of the potentiometer 520 which is excited with the reference voltage as indicated. The movable contact of the potentiometer is connected through the conductor 522 to the input of the amplifier 514 to close the servo loop. A rate stabilization signal voltage is derived from the tachometer generator 524 and applied to the input of the amplifier 514 through switch contacts 526. During the interval when the pipper is maintained on the target, the output shaft of servo 502 positions the movable contact of potentiometer 520 to develop a signal voltage proportional to the cross-wind velocity $V_x$.

At the termination of this tracking interval, the pickle switch 58 (FIGURE 6a) is closed and the relay 74 is energized. The switch actuating linkage 79 (FIGURE 6a) is suitably connected with the switch actuating linkage 79' (FIGURE 6). Accordingly, actuation of the pickle switch causes the switch contacts 516 and 526 to be displaced to the lower position. The actuation of switch 516 interrupts the input to motor 518 and interrupts the output of tachometer 524 and the output shaft of the servo 502 is frozen in the position existing at the instant of pickle switch operation. Accordingly, the cross-wind velocity $V_x$ at the pickle point is memorized by the cross-wind servo 502 as represented by the signal voltage on conductor 522.

Upon the actuation of the pickle switch in the manner just described, the output of the amplifier 514 is applied through the switch contacts 516 and conductor 527 to the servo motor 528 of the error angle servo 504. The servo 504 includes a tachometer generator 530 which develops a rate signal feedback voltage which is supplied through conductor 532 and switch contacts 526 to the input of amplifier 514. The servo 504 also includes a follow-up potentiometer 534 excited with the velocity signal voltage $V_a$ as indicated. The potentiometer 534 includes a movable contact driven by the output shaft of servo 504 and connected through conductor 535 and switch contacts 536 to the input of amplifier 514. The switch contacts 536 are also actuated by the linkage 79' to the closed position upon the actuation of the pickle switch.

Therefore, after the actuation of the pickle switch, the amplifier 514 receives an input signal voltage $V_aA_z$ on conductor 512 corresponding to the instantaneous value of correction being made to compensate for the cross-wind. The amplifier 514 also receives a signal voltage $V_x$ on conductor 522 corresponding to the memorized value of cross-wind velocity at the pickle point. Additionally, a rate stabilization feedback signal is applied to the amplifier 514 from the tachometer generator 530 through the conductor 532 and switch contacts 526. The servo loop is closed by a follow-up signal voltage from the potentiometer 534 through conductor 535 and switch contacts 536. The operation of the error angle servo 504 may be described by the mathematical relation:

$$V_aA_z - V_x = V_a e$$

where $e$ represents the angular error of the aircraft yaw or heading. This relationship obtains because the follow-up potentiometer 534 is excited with the velocity signal voltage $V_a$ and the output shaft therefore assumes as angular position corresponding to the angular error in the yaw or heading.

A potentiometer 538 excited with the reference voltage, as indicated, includes a movable contact which is adjustably positioned by the output shaft of the error angle servo 504. Accordingly, the voltage developed on this movable contact corresponds to the instantaneous or yaw or heading error, $e$, and is applied through conductor 540 to any suitable display or indicating means in the sight head 10. Preferably, this error angle signal voltage, $e$, is utilized in a servo driven optical projection system (not shown) to angularly displace a movable index pointer 542 with reference to the fixed indices 544 on the combining glass 128 (FIGURE 6b). To reduce the error angle to zero and thus achieve precise compensation for cross-wind effects, the pilot need only maintain the movable index 542 in alignment with the fixed indices 544. The angular displacement between these elements in the sight head display indicates to the pilot the extent of roll which must be imparted to the aircraft to produce the required change of yaw angle to reduce the error angle to zero. With the error angle maintained at zero in the bombing run from the pickle point to the point of bomb release, the velocity vector of the aircraft in ground coordinates is maintained in the vertical plane containing the pickle point, relative to the target, and the target, and the cross-wind effects are properly compensated to ensure accuracy of bomb delivery.

Figure 7:
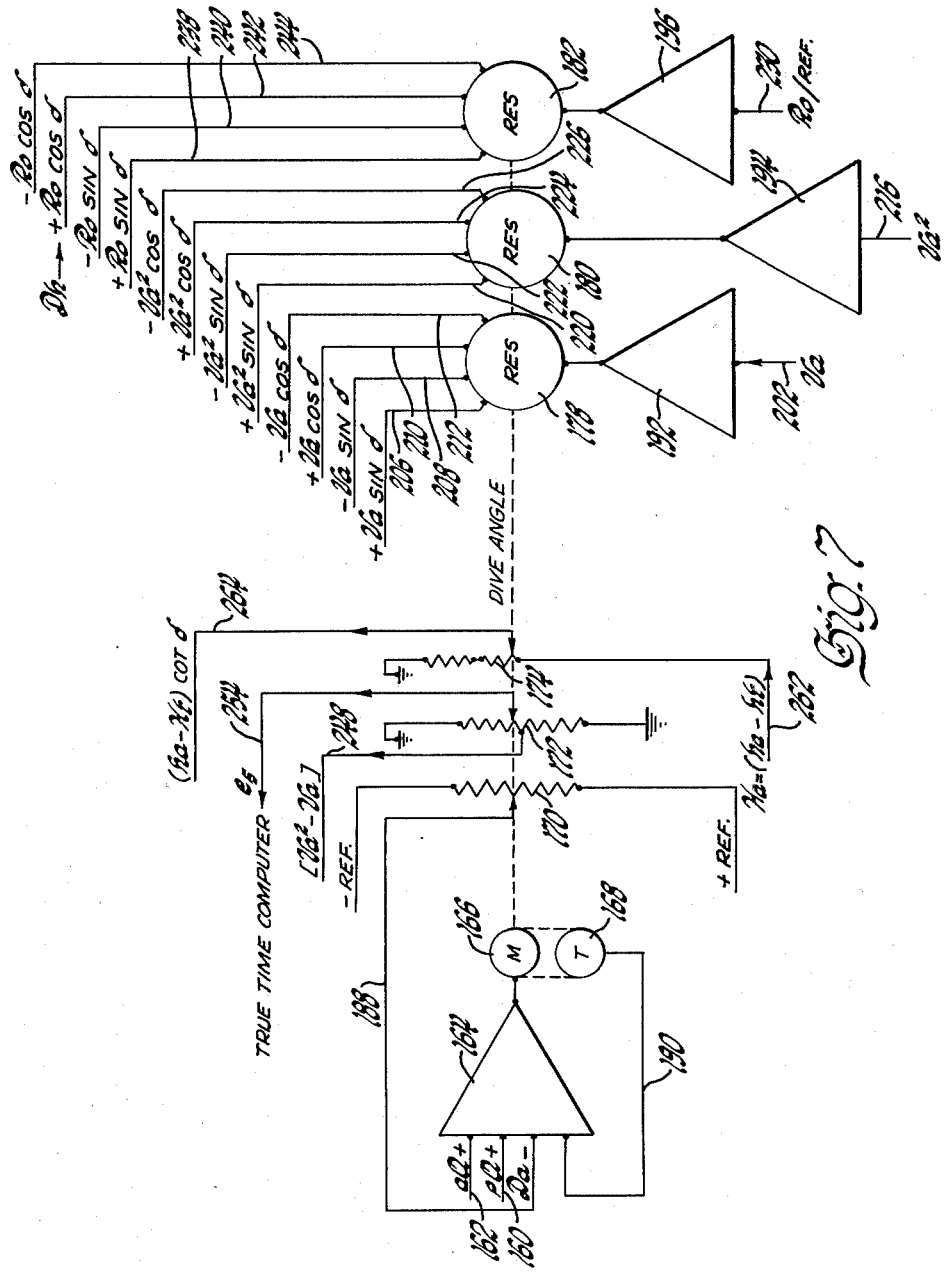

The dive angle computation is performed in the dive angle servo 12, the input of which is connected over line 160 to receive a signal related to the pitch angle output, $pA$, of the vertical gyro 34 and over lines 162 and 131 to receive a signal related to the craft attack angle, $aA$, from the air data computer 36. The dive angle servo and function generator is illustrated more fully in FIG. 7 and includes a conventional mixing or summing amplifier 164, a reversible servo motor 166, a tachometer generator 168 and a plurality of adjustable potentiometer devices 170, 172 and 174 and electromechanical sine-cosine resolver devices 178, 180 and 182, all of which are coupled to and positioned by the shaft of the servo motor. The end terminals of the linear potentiometer 170 are connected to the balanced output terminals of the reference source 152, and its slider arm is connected back over line 188 to apply a position feedback signal to the input of the summing amplifier to close the servo loop. The summing amplifier 164 algebraically combines the pitch angle and attack angle signals with the position feedback signal to produce a resultant difference or error signal which is applied from the output of the amplifier to the servo motor 166 to control the direction and extent of rotation thereof. At balance or equilibrium, the oppositely phased position feedback signal is equal to the sum of the dynamic data signals applied to the servo amplifier. The error signal then will be zero and the shaft of the servo motor will come to a rest position representing the sum of the pitch angle and attack angle quantities to yield dive angle.

The motor 166, like the other servo motors employed throughout the computer, may be a two-phase servo motor having a control winding whose energization is controlled in accordance with the magnitude of the error signal, and a reference winding which may receive its energization from the reference source 152. The tachometer generator 168 is driven by the servo motor and supplies a velocity feedback signal over line 190 to the input of the servo amplifier for stabilization purposes, in known manner.

The resolver devices 178, 180 and 182 are conventional electro-mechanical sine-cosine resolvers having individual input windings, which are energized from various data sources through isolation amplifiers 192, 194 and 196, and pairs of quadrature related output windings which are balanced with respect to ground. The input winding of resolver 178 is energized by an A.C. signal related to $V_a$ applied thereto from the air data computer over line 200, amplifier 124 and line 202 and provides the quadrature related signals $\pm V_a \sin DA$ and $\pm V_a \cos DA$ between its respective output conductors 206, 208, 210 and 212 and ground. The resolver 180 has its input winding connected to be energized in accordance with a signal proportional to true air speed squared or $V_a^2$ applied thereto from the air data computer over line 214, amplifier 126, line 216 and amplifier 194 and provides the quadrature related signals $\pm V_a^2 \sin DA$ and $\pm V_a^2 \cos DA$ over conductors 220, 222, 224, and 226 connected to its output windings.

The input winding of resolver 196 is adapted to be energized from either the radar apparatus 32 or the reference source 152 and is connected in a circuit which includes conductor 230 and switch arm 78 of the pickle switch relay. In its unpickled or upper contact position, switch arm 78 is connected over line 232 to the output of the radar apparatus 32. A branch conductor 234 also supplies slant range information to the range drive of the sight head. In its pickled or lower contact position, switch arm 78 is connected over line 236 to the reference source 152, as shown. Thus, in the unpickled position of the relay 74, the outputs of the resolver 182 taken from conductors 238, 240, 242 and 244 will be $\pm R_0 \cos DA$ and $\pm R_0 \sin DA$, and in the pickled position of the relay the outputs will be $\pm \sin DA$ and $\pm \cos DA$.

The potentiometer 172 is energized by a signal related to the quantity $(V_a^2 - V_a)$ which is applied from the output of a summing amplifier 246 over conductor 248 to a tapped point intermediate the grounded ends of the potentiometer. The input of the amplifier 246 is connected to receive a signal related to $-V_a$ over line 250 from the output of amplifier 124 connected to the air data computer and a signal related to $+V_a^2$ over line 252 connected to line 216 from the output of the amplifier 126. The slider arm of the potentiometer 172 thus provides a signal functionally related to the product of $(V_a^2 - V_a)$ and dive angle DA and is applied over conductor 254 to the true time servo illustrated in FIG. 8.

It will be seen that the horizontal component of the slant range distance or the distance $D_h$ of the craft to the target measured along the ground is attained from one of the outputs, $R_0 \cos DA$, of the resolver 182. This signal is applied over line 242 from the output of the dive angle servo and function generator to one of the contacts of the range selector switch 64.

When radar operation is not available or tactically not feasible, the distance $D_h$ may be obtained by resolving the distance $H_a$ representing the altitude of the craft above the horizontal target plane by the cotangent function of dive angle in accordance with Equation 3. The signal quantity $H_a$ is obtained in the output of a conventional mixing or summing amplifier 256 by addition of the signal quantities $+h_a$ and $-h_t$. The absolute altitude signal $h_a$ is applied to the input of the amplifier over line 258 from the air data computer. The target altitude signal $-h_t$ is applied to the input of the amplifier over line 260 from the hand set potentiometer 46, which is energized from the reference source 152, as indicated. The resulting signal quantity $H_a$ appearing in the output of the amplifier 256 is applied over line 262 to energize the potentiometer 174 which is a cotangent potentiometer, the slider arm of which is positioned in accordance with the dive angle position of the shaft of the servo motor 166. This arrangement constitutes a servo multiplier that produces a signal output appearing between the slider arm of the potentiometer and ground that is related to the product of $H_a$ and $\cot DA$, thus yielding the signal quantity $D_h$, as expressed in Equation 3. This quantity is then applied over line 264 to another one of the terminals of the range selector switch 64.

The range selector switch 64 is also adapted to receive and A.C. signal from the hand set I.P. pot 44, which is energized from the reference source 152 and provides a signal over line 268 from its slider arm proportional to the distance of the known identification point to the target. The range selector switch 64 is thus adapted to provide a selection of the horizontal distance to the target as obtained from radar ranging, altimeter ranging, or a known identification point and provides a signal related to this quantity to the input of the present position computer 14 from conductor 272, which extends between the switch arm of the range selector switch 64 and the lower contact or dive position of the switch arm 104 of the mode selector switch 60, and conductor 274 extending between switch arm 104 and the upper contact position of relay switch arm 80 (FIG. 6a) in the input of the present position computer.

Prior to the operation of the pickle switch 58, the present position computer is operated as a servo repeater of the distance $D_h$. Upon pickle, the horizontal craft-to-target distance $D_h$, which now becomes $D_p$, is memorized, and the operation of the computer is changed to that of an integrator to determine the distance $d_a$ of Equation 4 and provides an output signal representing the present position of the craft to the target or $D_p - d_a$. As illustrated in FIG. 6a, the present position computer 14 includes a summing amplifier 280, reversible servo motor 282, tachometer generator 284 and linear potentiometer 286. The potentiometer 286 is energized from the reference source 152 and has its slider arm connected over line 288 to supply a loop closing, position feedback signal to the input of the amplifier 280 through the upper contact position of switch arm 84. It will be seen that the only data signal applied to the input of the present position computer prior to pickle is the signal quantity $D_h$, whereby the shaft of the servo motor 282 will position the slider arm of the potentiometer 286 in accordance with this quantity.

Prior to pickle, the present position computer may also be used in conjunction with the wind computer 16 for computation of range wind or relative target motion. For this purpose the computer 14 supplies a rate signal related to the time rate of change of the horizontal craft-to-target distance or horizontal component of slant range $$\frac{d}{d_t}(R_o \cos DA)$$

This rate signal is derived from the output of the tachometer 284 and supplied to the wind computer over a circuit which includes line 292 connected to the lower contact or dive position of switch arm 108 of the mode selector switch 60, conductor 294 connected to the lower contact or computed wind position of switch arm 118 of the wind selector switch 66, and conductor 296 which is connected to the upper contact of relay switch arm 94 in the input of the wind computer.

The wind computer 16 is illustrated as comprising a summing amplifier 310, a reversible servo motor 312, and a pair of linear potentiometers 316 and 318, the slider arms of which are positioned by the shaft of the servo motor 312. In addition to the input signal quantity $V_g$ or $$\frac{d}{d_t}(R_o \cos DA)$$

the amplifier 310 of the wind computer is also adapted to be energized in accordance with a data signal related to the horizontal component of true airspeed or $V_a \cos DA$ which is designated as $V_{ah}$. This signal is derived and supplied from the output of the resolver 178 of the dive angle function generator 12 to the wind computer over a circuit which may be traced from conductor 210 (FIG. 6) to the lower contact or dive position of switch arm 106 of the mode selector switch 60, conductor 322 connected to the lower contact or computed wind position of switch arm 116 of the wind selector switch 66, and conductor 324 connected to the upper contact of relay switch arm 92 in the input of the amplifier 310.

In the unpickled position of the relay 74, the resulting signal output of the amplifier 310 will be related to the difference between the horizontal component $V_{ah}$ of true air speed and $V_g$ or $$\frac{d}{d_t}(R_o \cos DA)$$

The resulting signal will be seen to correspond to Equation 6 representing the expression for computed range wind $V_w$ and is applied from the output of the summing amplifier 310 to the control winding of the servo motor 312, whose shaft, therefore, will be positioned in $V_w$.

The motor 312 also positions the slider arm of potentiometer 316, which is a linear potentiometer that is energized from the oppositely phased or balanced output voltage terminals of reference source 152 and develops a signal voltage between its slider arm and ground whose instantaneous relative phase is either $+V_w$ or $-V_w$, depending upon whether $V_w$, is a head or tail wind, respectively. This signal is applied from the slider arm of this potentiometer over conductor 326 to the lower contact position of relay switch arm 82 in the input of the present position computer, the upper contact of which is grounded. Conductor 326 is also connected to the upper contact of the relay switch arm 90 to supply a loop closing, position feedback signal to the input of the wind computer. A tachometer feedback signal may also be employed in the wind computer for stabilization purpose, if desired.

Where an estimated statistical value of $V_w$ is desired, the wind selector switch 66 is moved to its upper or estimated position in which an estimated wind signal is supplied from the slider arm of the hand set potentiometer 52 over conductors 328 and 329, switch arm 116 now in its upper contact position, and conductor 324 to the wind computer. In its upper contact position, switch arm 118 opens the circuit otherwise completed therethrough to conductor 296 and switch arm 94 in the input of the wind computer. Thus, the only data signal applied to the wind computer in this phase of operation is that from the estimated wind potentiometer 52, and the wind computer acts merely as a servo repeater of this quantity.

Upon operation of the pickle switch 58 after the acquisition and target tracking phase, the inputs to the amplifier 310 of the range wind or relative target motion computer 16 are disabled or grounded, thus positioning and freezing the shaft of the servo motor 312 and the slider arm of potentiometer 316 in range wind, the magnitude of which at pickle is represented as $V_{wp}$. After pickle, relay switch arm 80 is positioned in its lower contact position, thereby disconnecting the position signal $D_h$ from the input of the present position computer and applying in its stead the signal $V_{ah}$ from the output of the dive angle servo over conductors 210 and 332, as shown. Relay switch arm 82 is connected to its lower contact or pickled position to receive from the wind computer a signal quantity over conductor 330 that is related to the memorized value of range wind $V_{wp}$ at pickle.

The output of the summing amplifier 280 of the present position computer 14 in this phase of operation will then be related to the difference between $V_{ah}$ and $V_{wp}$, thus yielding a signal quantity related to $V_g$ of Equation 5, which is applied to the control winding of the servo motor 282. After pickle, relay switch arm 84 is positioned in its lower contact position, thus lifting or interrupting the position feedback signal, which is applied to the input of the amplifier 280 from the potentiometer 286 prior to pickle, and applying in its stead a rate or derivative feedback signal from the tachometer 284 over conductor 292 and conductor 334, which is connected to the lower contact position of switch arm 84 and conductor 292. As a result of the velocity input signal $V_{ah}$ and the rate feedback signal, the present position computer will then operate as an integrator in known manner and will commence to displace the shaft of the servo motor 282 in accordance with the time integral of $V_g$ or $\int V_g dt$. The slider arm of the potentiometer 286 will then be moved in accordance with the time integral of $V_g$ from the setting of $D_p$ at which it was positioned at pickle when the present position computer was operating as a servo repeater and will produce a resultant output signal between the slider arm and ground related to $$D_p - \int_p^t V_g dt$$

This signal is equal to the present position of the craft to the target in the horizontal plane of the target.

The output signal $$D_p - \int_p^t V_g dt$$

from the present position computer is applied over conductors 288 and 338 to the input of the release computer 24 and is algebraically combined therein with the signal quantities $V_g M_d$, $V_w T_t$ and $R_h$ in accordance with the bomb release Equation 11 to control the application of an actuating signal to the bomb release mechanism 28.

The signal quantity $V_g M_d$ accounts for the effect of any inherent time delay, represented as $M_d$, in the bomb release mechanism 28 from the time of application of the bomb release actuating signal from the bomb release computer 24 to the time of actuation of the bomb release mechanism 28 and represents the horizontal distance that the craft will fly during this delay time. This correction signal is instrumented into the bombing computer system through the mechanism delay correction computer 22, which is constituted by the potentiometer 54. This potentiometer is a linear potentiometer whose slider arm is manually positioned in accordance with the known mechanism delay time, $M_d$, of the bomb release actuating mechanism for the particular weapon to be delivered by the craft. The potentiometer is energized by a signal related to $V_g$ which, in the illustrated version of the bombing computer, is applied thereto from the output of the tachometer 284 of the present position computer through conductor 342. The mechanism delay correction signal $V_g M_d$ appears between the slider arm of the potentiometer and ground and is applied to the input of the bomb release computer 24 over conductor 346.

The signal quantity $V_w T_t$ accounts for the relative displacement of the target during the bomb fall due to range wind and/or target motion. This signal is derived from the potentiometer 318, which is positioned in range wind by the range wind computer 16 and is energized by a signal quantity related to the true time of fall $T_t$ of the bomb along its predicted trajectory. The signal $T_t$ is derived from the true time servo 20, which also supplies a functionally related signal representing the horizontal range trajectory $R_h$ of the bomb to the input of the release computer.

The quantities $T_t$ and $R_h$ representing the true time of fall and the horizontal range trajectory of the bomb to the detonation altitude are determined from the following problem variables:

(a) $h_a$ = height of the aircraft above sea level;
(b) $h_t + h_d$ = height of the detonation above sea level;
(c) $V_a$ and $V_a^2$ = true air speed and true air speed squared of the aircraft relative to the air mass;
(d) $DA$ = direction of the $V_a$ vector relative to the horizontal.

These variables are instrumented into the true time servo 20 together with a number of other signal quantities related to linear sums and products or functions of $V_a$ and trigonometric functions of DA obtained from the dive angle servo and function generator to solve the following quadratic equation:

$$h_a - (h_t + h_d)\,[f_1(DA, V)] = [f_2(DA, V)]T_t^2 + [f_3(DA, V)]T + [f_4(DA, V)] \quad (12)$$

The above equation will be seen to be in the form of Equation 7 hereinabove. The functions $f_1$, $f_2$, $f_3$ and $f_4$ are, in general, quadratics in $V_a$ and trigonometric functions of DA and are of the following general form:

$$f_1 = a_1 + a_2 \cos DA + a_3 \sin DA$$
$$+ a_4 V_a + a_5 V_a \cos DA + a_6 V_a \sin DA$$
$$+ a_7 V_a^2 + a_8 V_a^2 \cos DA + a_9 V_a^2 \sin DA \quad (13)$$
$$f_2 = b_1 + b_2 \cos DA + b_3 \sin DA + b_4 V_a$$
$$+ b_5 V_a \cos DA + b_6 V_a \sin DA + b_7 V_a^2$$
$$+ b_8 V_a^2 \cos DA + b_9 V_a^2 \sin DA \quad (14)$$

et cetera.

The quantities $a_i = a_1 \ldots a_n$, $b_i$, $c_i$, $d_i$, in the above expressions are constants. The specific form of each of the expressions for $f_1$, $f_2$, $f_3$ and $f_4$ is developed by inserting these expressions in their general form in Equation 12 and determining the constants $a_i$, $b_i$, $c_i$, $d_i$ in the resulting equation in accordance with the method of least squares approximation to the standard ballistics tables to minimize the errors on $T_t$ and $R_h$. This involves assuming the general form of the expressions for $f_1$, $f_2$, $f_3$ and $f_4$ and substituting them in Equation 12, squaring the resulting equation, differentiating the squared equation separately with respect to each of the constant terms $a_i(a_1 \ldots a_n)$, $b_i(b_1 \ldots b_n)$, $c_i(c_1 \ldots c_n)$ and $d_i(d_1 \ldots d_n)$, whose magnitudes are to be determined, summing up the terms of the differentiated equations for a set of $n$ points, equating the summed equations to zero to obtain a set of simultaneous equations expressed in terms of the aforesaid unknown constants and $T_t$, and solving this set of equations simultaneously for each of the terms $a_1 \ldots a_n$, $b_1 \ldots b_n$, $c_1 \ldots c_n$ and $d_1 \ldots d_n$ in Equation 12 to arrive at the best fit to the given set of points. These points are selected from the craft flight envelope which relates the values of $R_h$ and $T_t$ obtained from the standard ballistics tables to all of the altitudes, velocities and attitudes that the craft may assume in the plane of the target during the bombing mode.

The true time servo is instrumented to solve the quantities $R_h$ and $T_t$ from quadratic equations in $T_t$ developed in the manner outlined above, from a plurality of data signals including $\pm V_a$, $\pm V_a^2$, $+h_a$, $-h_a$ and $-h_d$ and a plurality of signal quantities represented generally as $f(DA)$, $f(V_a)$, which are illustrated in FIG. 6 as being collectively applied to the input of the true time computer from the dive angle servo over a cable 360, which represents a plurality of conductors.

The mechanization of the true time servo is illustrated more fully in FIG. 8 which includes a summing amplifier 364, servo motor 366, tachometer 368 and a plurality of linear potentiometers 370, 372, 374, 376 and 378, the slider arms of which are positioned by the servo motor. The input of the amplifier 364 is connected to receive the following signal quantities from the various data and signal sources over the conductors which are designated in the parentheses after each signal quantity and may be identified in FIGS. 6 and 7: $+V_a^2 \cos DA$ (224); $+V_a^2 \sin DA$ (220); $-V_a^2$ (353); $-V_a \cos DA$ (212); $-V_a \sin DA$ (208); $+V_a$ (350); $+\cos DA$ (242); $+\sin DA$ (238); $-\text{REF}$ (source 152); a signal quantity designated as $e_5$ which is received over conductor (254) from the slider arm of pot 172 in the dive angle servo; another signal quantity designated as $e_2$ received over conductor (387) from the slider arm of pot 372; $-h_d$ (358); $-h_t$ (356); $+h_a$ (354); and a tachometer feedback signal from tachometer 368 over conductor 380.

Potentiometer 370 is energized from the output of an isolation amplifier 382, which combines the following signals that are applied to its input: $-V_a^2 \cos DA$ (226); $-V_a^2 \sin DA$ (222); $-V_a^2$ (353); $+V_a \cos DA$ (210); $+V_a \sin DA$ (208); $+V_a$ (350); $-\cos DA$ (244); $-\sin DA$ (240); and $-\text{REF}$ (source 152).

Potentiometer 372 is energized from the output of another isolation amplifier 384, which combines the following signals that are applied to its input: $-V_a^2 \cos DA$ (226); $+V_a^2 \sin DA$ (220); $-V_a^2$ (353); $+V_a \cos DA$ (210); $+V_a \sin DA$ (208); $+V_a$ (350); $-\cos DA$ (244); $-\sin DA$ (240); $-\text{REF}$ (source 152); and a signal quantity designated as $e_1$ which is received over conductor 386 connected to the slider arm of pot 370.

Potentiometer 374 is energized from the output of an isolation amplifier 388 which combines the following signals that are applied to its input: $-V_a^2 \cos DA$ (226); $+V_a^2 \sin DA$ (220); $+V_a^2$ (352); $+V_a \cos DA$ (210); $-V_a \sin DA$ (208); $-V_a$ (351); $-\cos DA$ (244); $+\sin DA$ (238); and $+\text{REF}$ (source 152).

Potentiometer 376 is also energized from the output of an isolation amplifier 390 which combines the following input signals that are applied to its input: $-V_a^2 \cos DA$ (226); $+V_a^2 \sin DA$ (220); $V_a^2$ (352); $+V_a \cos DA$ (210); $-V_a \sin DA$ (208); $-V_a$ (351); $-\cos DA$ (244); $+\sin DA$ (238); $+\text{REF}$ (source 142); and a signal quantity designated as $e_3$ which is received over conductor 292 from the slider arm of the potentiometer 374.

With the above described input signals, the true time servo is instrumented to solve the quadratic expressions for $R_h$ and $T_t$ developed as described above. The true time servo is a variable gain servo which performs an implicit computation upon the developed quadratic expressions for $R_h$ and $T_t$. In the case of the generalized Equation 7 for example, this involves setting the equation equal to zero and rotating the servo motor until the sum of the inputs for any given set of conditions is zero, at which point the the shaft position of the servo motor 366 will be related to $T_t$. The quantity $T_t^2$ is introduced into the mechanization of the system by energizing the amplifier 384 with the signal quantity $e_1$ from the output of the first potentiometer 370. The electrical output of the second potentiometer 372 will then be related to $T_t^2$ which is applied as the signal quantity $e_2$ to the input of the main summing amplifier.

Potentiometers 374 and 376 are used in the computation of $R_h$, the instrumentation of which is similar to that for $T_t$. The output of potentiometer 376 appearing between its slider arm and ground is taken as the value of $R_h$ at each point along the flight path.

Potentiometer 378 is energized from the reference source 152, as indicated, and since its slider arm is positioned in true time, it provides an electrical signal related to the value of $T_t$ at each point along the flight path.

The $R_h$ output of potentiometer 376 is applied from the true time computer over conductor 396 to the input of the release computer. The true time signal $T_t$ is applied from the slider arm of pot 378 over conductor 398 to a balanced phase inverter or phase splitter 400 which supplies a pair of oppositely phased signals related to plus and minus $T_t$ over conductors 402 and 404 for energization of the potentiometer 318 in the wind computer. This potentiometer is positioned in range wind $V_w$ and supplies an electrical signal output related to the product $V_w T_t$ between its slider arm and ground to the input of the release computer over conductor 406.

The manner in which the various signal components of the bomb release Equation 11 are derived, has now been fully described. These signals are applied to the input of the bomb release computer 24 which includes a summing amplifier 410 and a suitable null sensing or detecting device such as a phase sensitive amplifier 412, which may be of conventional design. The phase sensitive amplifier senses or detects the instant when the algebraic sum of the signals in the input of the bomb release computer passes through zero and develops an output voltage to energize relay 414 connected in its output. This causes power switch 415 to be closed against its fixed contact in the bomb release mechanism actuating circuit.

The bomb release actuating mechanism 28 is energized over a circuit which includes a source of D.C. power 418, conductor 420, relay operated power switch 422, conductor 424, switch arm 96 of relay 74, conductor 428 connected to the switch arm 415 of the relay 414, conductor 429, the automatic-manual release selector switch 72, conductor 430, the normally closed contacts of a relay operated power switch 432 contained in the escape time interlock 26, and conductor 434 to the bomb release mechanism 28. The actuating coil 423 of the normally open power switch 422 receives its energization from the same power source that supplies power to the various elements of the computer. Thus, in the event of a computer power supply failure, switch 422 will be open and no power will be available to operate the bomb release mechanism for automatic bomb release. Also, if the pickle switch is not closed, automatic release cannot take place since switch 96 will be open. In its pickled position, switch 96 is closed against its lower contact to supply power to switch 415. Switch 415 closes against its fixed contact when any satisfactory solution to the bomb release Equation 11 is obtained, as explained above, and applies power to the selector switch 72. For automatic bomb release, switch 72 is in its normally closed position shown to supply power to the bomb release mechanism through the escape time interlock mechanism 26.

The escape time interlock 22 functions to prevent bomb release in the event that the computed time of fall $T_t$ of the bomb is less than a predetermined minimum safe, set-in value that affords the pilot a safe margin of time to execute an escape manuever beyond the detonation area or burst of the bomb. The escape time interlock includes a summing or phase sensitive amplifier 438 which controls the energization of the relay 440 connected in its output. This amplifier is connected to receive a true time signal $-T_t$ from the true time computer over conductor 398, phase splitter 400 and conductor 404 and an escape time signal $+T_e$, which is derived from the hand set potentiometer 50. Potentiometer 50 is a linear potentiometer which is energized from the reference source 152, as shown, and has its slider arm connected over conductor 442 to the input of the phase sensitive amplifier. So long as the signal $T_t$ is greater than the signal quantity $T_e$, the switch 441 of the escape time interlock relay 440 will be in its circuit completing position shown to supply power to the bomb release mechanism. If the true time signal $T_t$ is less than the predetermined value of the escape time signal, the power circuit for the bomb release mechanism will be open and the bomb cannot be released automatically.

The operation of the bombing computer in dive toss mode of operation should be apparent from the foregoing. In order to adapt the system from the dive toss to the true dive mode, the dive-dive toss selector switch 70 is positioned in its dive or upper contact position to permit the application of a signal from the output of the amplifier 410 in the bomb release computer over conductor 446 to the elevation channel of the sight head 10. The reticle of the sight head will then be maintained in a lead predicting position by the output of the summing amplifier 410 which instruments the correct elevation lead prediction angle into the sight and enables the pilot to fly the proper dive lead predicting course. The pilot may then operate the manual release switch 68 at any time that he is tracking the target to effect manual operation of the bomb release mechanism provided that the selector switch 72 is in its open or manual selector position. Automatic bomb release may be had in this mode when the selector switch 72 is in its automatic or closed position shown.

In the level and level toss bombing approach modes, the mode selector switch 60 is positioned in its upper contact or level selector position. Since the pilot flies a constant altitude approach it will be necessary to depress the sight line of the sight head in order to determine the proper moment of pickle. This is accomplished by the sight depression angle potentiometer assembly 42 which includes a linear potentiometer 450 and a cosine potentiometer 452, the slider arms of which are ganged together. Potentiometer 452 is energized from the reference source 152 and supplies a signal related to the angle SDA of FIG. 5 to the elevation channel of the sight head through the upper contact position of the mode selector switch 110. In order to stabilize the depressed line of sight in pitch, a pitch angle quantity $p_a$ is also supplied to the elevation channel of the sight head in this mode over conductor 456.

Since the radar is slaved to the depressed line of sight, it will supply an output signal related to the slant range quantity $R_o$ indicated in FIG. 5. The potentiometer 450 is energized from the radar range signal and is manually positioned in SDA to produce an output signal between its slider arm and ground related to $R_o \cos SDA$. The output signal $R_o \cos SDA$ is the desired $D_p$ value, as expressed in Equation 9, and is applied over conductor 460 through the upper contact position of switch 104, conductor 274 to the input of the present position computer to set up the integrator in the same manner as that described for the dive toss mode.

Because the line of sight is not continuously held on the target, but rather sweeps forward along the terrain, continuous indication of ground speed is not possible. Range wind, which in the dive-toss mode, is computed by subtracting horizontal true airspeed from the rate of change of ground distance to target, must be manually set in and added to horizontal true airspeed to obtain ground velocity.

What is claimed is:

1. An aircraft bombing computer system adapted to effect release of a bomb at a point where the aircraft flight path is tangent to a predicted bomb trajectory intersecting a selected target including means measuring the horizontal ground range distance of the craft to the target from a point on the flight path representing an initial position of the craft and developing an electrical signal proportional thereto, means continuously measuring the ground range distance the craft has flown in a horizontal direction from said point and developing an electrical signal proportional thereto, means continuously predicting the bomb trajectory at each point along the flight path and developing an electrical signal representing the horizontal distance component thereof, amplitude comparison means connected to receive said signals and comparing said signals representing the last two named distances with said first signal and developing a resultant electrical control signal related to the difference thereof, and a bomb release control means actuated by said amplitude comparison means when the said difference signal passes through zero.

2. An aircraft bombing computer system adapted to effect release of a bomb at a point where the aircraft flight path is tangent to a predicted bomb trajectory intersecting a selected target including means measuring the horizontal range distance of the craft to the target and developing a dynamic signal representative of the instantaneous value thereof, means connected to said last named means for memorizing the instantaneous value of said horizontal range distance at a point on the flight path representing an initial position of the craft and developing static electrical signal proportional thereto, means continuously measuring the ground range distance the craft has flown in a horizontal direction from said point and developing a dynamic signal proportional thereto, means continuously predicting the bomb trajectory at each point along the flight path and developing a dynamic signal representing the horizontal distance component thereof, amplitude comparison means connected to receive said static and dynamic signals and developing a resultant electrical control signal corresponding to the difference between the static signal and the sum of the dynamic signals, and a bomb release control means actuated by said amplitude comparison means when the said control signal passes through zero.

3. An aircraft bombing computer system adapted to effect release of a bomb at a point where the aircraft flight path is tangent to a predicted bomb trajectory intersecting a selected target including means measuring the horizontal ground range distance of the craft to the target from a point on the flight path representing an initial position of the craft and developing an electrical signal proportional thereto, means continuously measuring the ground range distance the craft has flown in a horizontal direction from said point and developing an electrical signal proportional thereto, said last named means including means for measuring the velocity of the craft relative to the target and developing an electrical signal proportional thereto and electrical integrating means connected to receive said signal and integrating said signal with respect to time, means responsive to aircraft dive angle altitude and velocity for continuously predicting the bomb trajectory at each point along the flight path and developing an electrical signal representing the horizontal range distance component thereof, amplitude comparison means connected to receive said distance signals and developing a resultant electrical control signal corresponding to the difference between the first-mentioned signal and the sum of the later-mentioned signals, and a bomb release control means actuated by said amplitude comparison means when the said control signal passes through zero.

4. A bombing computer system for determining the appropriate point along the flight path of an aircraft to release a bomb along a predicted trajectory tangent to the flight path and intersecting a selected target including means measuring the horizontal ground range distance of the craft to the target from a point on said flight path representing an initial position of the craft and developing a first electrical signal proportional thereto, means continuously measuring the horizontal ground range distance the craft has flown in a horizontal direction from said point and developing a second electrical signal proportional thereto, means continuously measuring the horizontal distance component of the bomb trajectory representing the distance along the ground that the bomb would travel if released at any point along the flight path and developing a third electrical signal proportional thereto, a release computer connected to receive said distance signals and developing a control signal corresponding to the difference between the first signal and the sum of the second and third signals, a release mechanism actuated by said release computer when said control signal passes through zero, said release mechanism having a known time delay between actuation and release, a correction computer for developing a fourth signal proportional to the horizontal ground range distance traversed by the craft during the interval of said time delay, and means adding said fourth signal to the sum of the second and third signals in said release computer to cause the actuation of the release mechanism in advance of said release point.

5. An aircraft bombing computer system adapted to effect release of a bomb at a point where the aircraft flight path is tangent to a predicted bomb trajectory intersecting a selected target including means measuring the horizontal range distance of the craft to the target from a point on the flight path representing an initial position of the craft and developing an electrical signal proportional thereto, means continuously measuring the distance the craft has flown in a horizontal direction from said point and developing an electrical signal proportional thereto, means continuously predicting the bomb trajectory at each point along the flight path and developing a pair of related electrical signals, one representing the horizontal distance component of the predicted bomb trajectory and the other the true time of fall of the bomb along the trajectory, a bomb release computer connected to receive said distance signals and developing a resultant electrical control signal related to the difference between said first named distance and the sum of said last two named distances and a bomb release control means actuated by said amplitude comparison means when the said difference signal passes through zero, a bomb release mechanism operated by said bomb release control means upon actuation thereof, and an escape time interlock connected between said bomb release control means and said bomb release mechanism and responsive to said true time of fall signal, said escape time interlock preventing operation of said bomb release mechanism by said bomb release control means when said time of fall signal is less than a predetermined value.

References Cited in the file of this patent

UNITED STATES PATENTS

| | | |
|---|---|---|
| 2,480,208 | Alvarez | Aug. 30, 1949 |
| 2,518,916 | Luck | Aug. 15, 1950 |
| 2,519,180 | Ergen | Aug. 15, 1950 |
| 2,609,729 | Wilkenson et al. | Sept. 9, 1952 |
| 2,652,979 | Chance | Sept. 22, 1953 |
| 2,717,120 | Bellamy | Sept. 6, 1955 |
| 2,758,511 | McLean et al. | Aug. 14, 1956 |
| 2,784,908 | Gray et al. | Mar. 12, 1957 |
| 2,823,585 | Gray et al. | Feb. 18, 1958 |
| 2,823,586 | Havens et al. | Feb. 18, 1958 |
| 2,825,055 | Chance | Feb. 25, 1958 |